United States Patent
Ross et al.

(10) Patent No.: US 7,141,099 B2
(45) Date of Patent: Nov. 28, 2006

(54) FLARE TANK APPARATUS FOR DEGASSING DRILLING FLUID

(75) Inventors: Stanley R. J. Ross, Fort St. John (CA); Roddy J. Ross, Fort St. John (CA)

(73) Assignee: Wellco Energy Services Partnership, Calgary (*) Notice: Subject to any disclaimer, the term of this patent is extended or adjusted under 35 U.S.C. 154(b) by 249 days.

(21) Appl. No.: 10/765,938

(22) Filed: Jan. 29, 2004

(65) Prior Publication Data
US 2005/0166759 A1   Aug. 4, 2005

(51) Int. Cl.
*B01D 19/00*  (2006.01)

(52) U.S. Cl. .......................... 96/155; 96/204; 55/356; 210/241; 175/206; 220/562; 285/272

(58) Field of Classification Search ............... 96/155, 96/204, 197; 95/262, 266; 55/356; 210/241; 175/206; 220/562; 431/202; 285/33, 272; 137/799
See application file for complete search history.

(56) References Cited

U.S. PATENT DOCUMENTS

| | | | |
|---|---|---|---|
| 251,785 A | 1/1882 | Litchfield et al. | |
| 1,293,761 A | 2/1919 | Gulick | |
| 2,099,779 A | 11/1937 | Tremolada | |
| 2,919,898 A | 1/1960 | Marwil et al. | |
| 3,115,157 A * | 12/1963 | Coats ..................... 137/561 R |
| 3,498,325 A * | 3/1970 | Ashton et al. .............. 137/615 |
| 3,633,687 A * | 1/1972 | West et al. ................... 175/48 |
| 3,738,436 A | 6/1973 | Litchfield et al. |
| 4,066,098 A * | 1/1978 | Gallo ........................ 137/615 |
| 4,126,419 A | 11/1978 | Katabuchi et al. |
| 4,666,471 A * | 5/1987 | Cates ......................... 95/262 |
| 4,844,133 A * | 7/1989 | von Meyerinck et al. .. 141/387 |
| 5,807,095 A * | 9/1998 | Gustafson et al. .......... 431/202 |
| 5,882,187 A | 3/1999 | Gustafson et al. |
| 5,919,036 A | 7/1999 | O'Brien et al. |
| 5,928,519 A * | 7/1999 | Homan ........................ 210/741 |
| 5,997,284 A * | 12/1999 | Gustafson et al. .......... 431/202 |
| 6,390,190 B1 | 5/2002 | Mullins |

* cited by examiner

*Primary Examiner*—Duane Smith
*Assistant Examiner*—Douglas J. Theisen
(74) *Attorney, Agent, or Firm*—Oyen Wiggs Green & Mutala LLP

(57) ABSTRACT

A flare tank apparatus for separating combustible gases from a mixture of such gases and a liquid, for example combustible gases in drilling fluid from an oil or gas drill string. The apparatus has an inlet conduit having two or more connectors which permit components of the inlet conduit to swivel relative to each other. The connectors can be loosened to permit swivelling without disassembling the inlet conduit. The swivelling of the connectors permits the free end of the inlet conduit to be moved and positioned for connection to the outlet end of a flare line from the drill string and to be positioned against the holding tank of the flare tank apparatus for convenient transport.

15 Claims, 3 Drawing Sheets

US 7,141,099 B2

FLARE TANK APPARATUS FOR DEGASSING DRILLING FLUID

TECHNICAL FIELD

The invention pertains to a flare tank apparatus for use in safely separating combustible gases from the fluid produced in oil and gas drilling operations.

BACKGROUND

Flare tanks are used in oil and gas drilling operations for disposing of combustible waste gases in a manner that protects oilfield workers. For example, they are commonly used to burn off the small pockets of gas encountered during drilling. They also separate the liquids mixed with the waste gas, such as water and drilling mud, and hold them for disposal by environmentally acceptable means in order to prevent ground contamination. Prior art flare tank apparatuses are described, for example, in U.S. Pat. Nos. 5,807,095, 5,882,187 and 5,997,284 (Gustafson et al.).

Flare tanks may be portable apparatuses that are moved to job sites as needed. At a job site, the flare tank is connected to a flare line, i.e. the conduit that extends from the drill string and carries to the flare tank the liquid and combustible gases to be treated. In the prior art, a connection between the outlet end of the flare line and the inlet of the flare tank apparatus is made by welding a connecting member therebetween. The use of a welded connection increases the cost of both connecting and subsequently disconnecting the flare tank apparatus. It would be desirable to provide a flare tank apparatus having improved means for convenient connection to the flare line.

SUMMARY OF INVENTION

The invention provides a flare tank apparatus for separating combustible gases from a mixture of such gases and a liquid. The apparatus has a degasser for receiving the gases and liquid, with an inlet port, a liquid outlet port and a gas outlet port. A holding tank is operatively connected to the liquid outlet port of the degasser for receiving the liquid that has been separated in the degasser, at least partly, from the gases. The apparatus has a flare stack for conveying the gases from the gas outlet port of the degasser to a burner where they can be burnt off. The apparatus includes an inlet conduit that is operatively connected at one end to the inlet port of the degasser and is adapted to be connected at its second end to a flare line. The inlet conduit comprises at least two connectors which permit components of the inlet conduit to swivel relative to each other. The connectors can be loosened to permit such swivelling without disassembling the inlet conduit. When the connectors are tightened, the components no longer swivel, locking the inlet conduit in position for use. The swivelling of the connectors permits the free end of the inlet conduit to be moved and positioned for easy connection to the outlet end of the flare line.

According to preferred embodiments of the invention, the inlet conduit preferably comprises at least four elbows which each define an angle of approximately 90 degrees. It preferably comprises a conduit section that connects to the flare line in a substantially horizontal position. The inlet conduit folds to a compact position against the holding tank for transport of the apparatus.

The holding tank is preferably an open-top tank and the degasser is positioned within the holding tank and extending upwardly therefrom.

The inlet port of the degasser is preferably positioned such that part of its area, for example one half, is above and part is below an upper edge of the side walls of the holding tank.

The inlet port of the degasser may be in a side wall of the degasser and the inlet conduit may comprise a conduit section that connects to the inlet port in a generally horizontal position.

DESCRIPTION OF THE PREFERRED EMBODIMENTS

Figure 1:
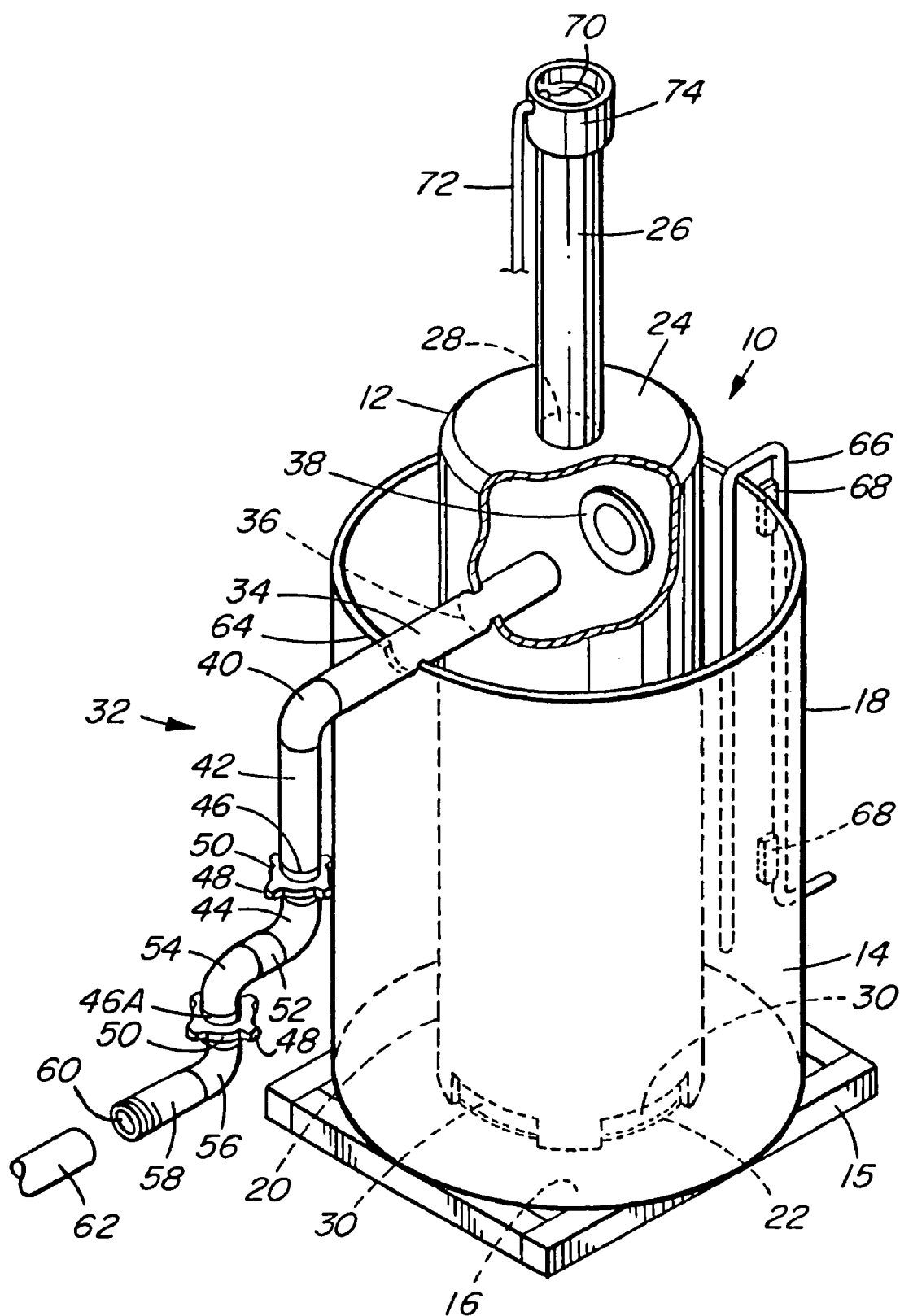
FIG. 1 is a perspective view, partly in cut-away, of a preferred embodiment of the flare tank apparatus, with the inlet conduit extended for connection to a flare line.

Flare tank apparatus 10 comprises principally an inner tank or degasser 12 and an outer tank or holding tank 14. The holding tank 14 is an open-top cylindrical tank having a bottom wall 16 and side wall 18. The walls may comprise a double shell for strength and worker safety. The flare tank apparatus is affixed to a skid 15 to facilitate lifting and transport.

The degasser 12 is a cylindrical tank having a side wall 20, bottom wall 22 and upper wall 24. A flare stack 26 is affixed to the upper wall 24 which has a gas outlet port 28 therein, whereby the interior of the degasser is open to the stack 26. The side wall 20 has liquid outlet ports 30 therein at its lower edge, whereby liquid (principally drilling mud) in the degasser can flow into the holding tank 14, as described below.

An inlet conduit 32 is adapted to conduct fluid from a flare line 62 into the degasser. It comprises components to facilitate bath connection to the flare line and compact placement against the side wall 18 of the holding tank 14. A straight pipe section 34 connects to the inlet port 36 of the degasser. The connection is preferably approximately horizontal. The pipe section 34, or an extension thereof, extends into the interior of the degasser 12 and is directed approximately horizontally towards a wear plate 38, which is welded to the side wall 20. It is possible for the wear plate to be omitted from the apparatus, in which case incoming fluid will directly strike the side wall of the degasser. However, to protect the side wall from excessive wear, a wear plate is preferred.

The outer end of pipe section 34 is connected to an elbow 40, which (like the other elbow components of the inlet conduit 32) forms an angle of approximately 90 degrees. A straight pipe section 42 is connected to the other end of the elbow 40 and is positioned generally vertically adjacent to the outer wall 18 of the holding tank. The lower end of the pipe section 42 is connected to an elbow 44 by a union 46. The elbow 44 can be swivelled relative to the pipe section 42, by virtue of the union 46. The union, 46 is preferably a hammer union, having wings 48 (best seen in FIG. 3) that permit the union ring member 50 to be turned by hammer blows in order to tighten and loosen the union 46. Hammer unions of the type used in the inlet conduit 32 are commercially available connectors that are well known in the pipefitting arts. When a union is loosened, the components on either side of it can be swivelled relative to each other without disassembling the inlet conduit.

The elbow 44 connects at its other end to a straight pipe section 52, which in turn connects to an elbow 54. The elbow 54 is oriented such that its other end is directed approximately vertically downward. Elbow 56 is connected to elbow 54 by a union 46A, which is identical in structure to the union 46 and which permits the elbow 56 to be swivelled relative to the elbow 54. A straight pipe section 58 is connected to the other end of the elbow 56, extending approximately horizontally. The open end 60 of the pipe section 58 is preferably threaded and is adapted for connection to the flare line 62.

The degasser inlet port 36 is positioned such that approximately half its area is above and half is below the top edge 64 of the holding tank 12, i.e. its centre point is at about the horizontal level of the edge 64. As a result, the top half of the pipe section 34 is above the edge 64 of the flare tank, for reasons discussed below.

A suction pipe 66 is attached to the side wall 18 of the holding tank by brackets 68. It is open at both ends and extends from adjacent the bottom wall 16 on the inside of the holding tank to the lower part of the outside of the holding tank. It is used for removal of liquid from the holding tank.

The flare stack 26 has a burner 70 at its top end, fed by a gas line 72. The top end of the flare stack and the burner are surrounded by a cylindrical windguard 74. The flare stack may be extended by one or more extension pipes extending vertically therefrom so that the top of the stack, and the burning of combustible gases at the top, is at any desired height above the ground.

If desired, the flare tank apparatus may be configured to hold more than one degasser, for example two or three degassers, within the holding tank, to provide backup or greater drilling fluid handling capacity.

The flare tank apparatus is preferably constructed of steel that has qualities of strength and corrosion resistance suitable to the application. The apparatus may be of any appropriate size. By way of example, the degasser may be about 42 inches in diameter and ten feet high; the flare stack may be about five feet high; the holding tank may be about eight feet high, and the inlet conduit may be about eight inches in outer diameter.

The flare tank apparatus 10 is used in the following manner. Once positioned in a suitable location relative to a flare line, the end 60 of the inlet conduit 32 is connected to the flare line 62. To do this, unions 46 and 46A are loosened and the elbows 44, 56 are swivelled as necessary to position the pipe section 58 for connection to the flare line. The unions 46, 46A are then tightened to secure the inlet conduit 32 in the desired position. Gases and liquids from the drill string are allowed to flow into the degasser 12 through the inlet conduit 32, typically at high pressure, and strike the wear plate 38. Within the degasser, the gases and liquids tend to separate. The gases, being lighter, rise and exit the degasser through the gas outlet port 28 and stack 26, and are burned off at the top end of the stack. The liquids, being heavier, fall to the bottom of the degasser and flow out through the outlet ports 30 into the flare tank.

When appropriate, liquid is removed from the holding tank by applying suction to the outer end of the suction pipe 66. It will be apparent that liquids in the bottom of the holding tank and the degasser will come to a common level. If the holding tank fills to its upper edge 64, liquid will flow out over its side walls 18 (though it will be understood that liquid should be suctioned out of the holding tank before that occurs). However, since the upper half of the pipe section 34 is above the level of the upper edge 64, gas and liquids can continue to flow into the degasser 12, even though the bottom half of the pipe 34 may be obstructed. Likewise, freezing of the liquid in the bottom half of the pipe section 34 (which can occur where the apparatus is used in cold conditions and the holding tank is full) will not prevent inflow through the top half of the pipe section 34. Although the inlet port could, in principle, be positioned fully above the level of the upper edge 64 of the holding tank, since liquids can, at least temporarily, fill the degasser up to the height of the inlet, any raising of the height of the inlet port would reduce the free space within the degasser, resulting in reduced efficiency of separation of gases from liquid in the degasser. The positioning of the inlet port so that its centre is at the horizontal level of the top edge 64 of the holding tank is therefore the optimal position.

Some amount of combustible gases may still be present in the liquid in the bottom of the degasser and in the holding tank, since complete separation of the gases and liquid may not occur. To protect oilfield workers from the hazards posed by such gases, the side walls of the holding tank are preferably higher than the height of a worker.

Figure 2:
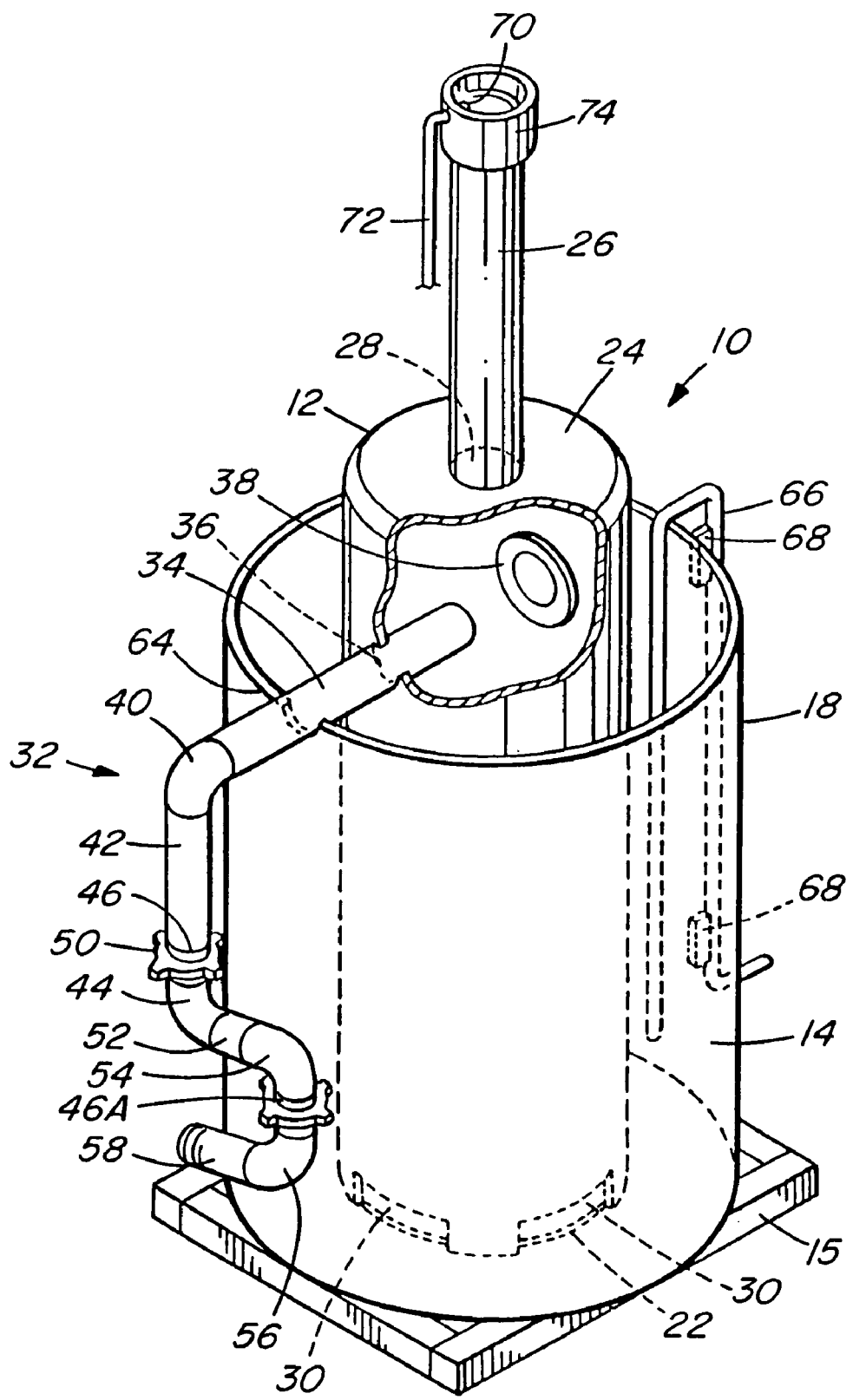
FIG. 2 is another perspective view of the flare tank apparatus, with the inlet conduit folded adjacent to the side wall of the holding tank for transport.
Figure 3:
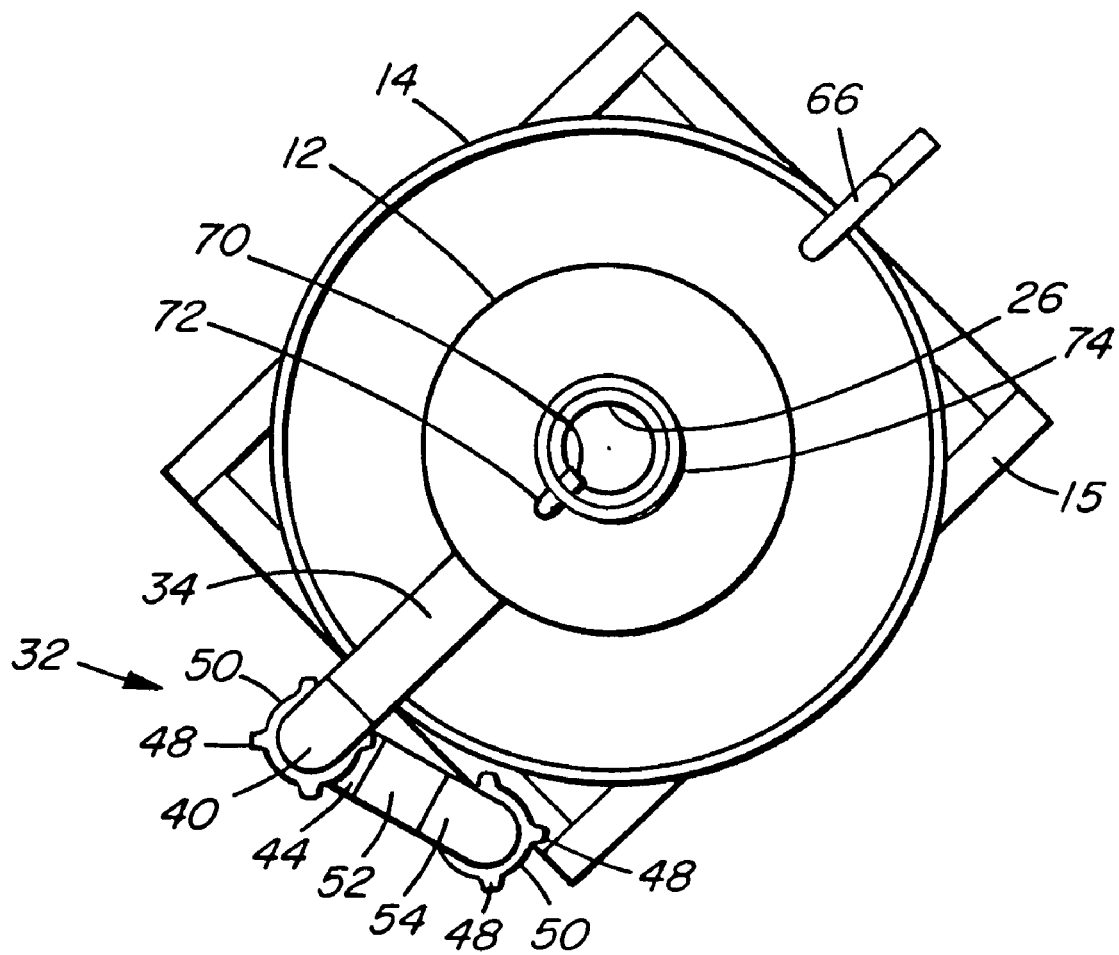
FIG. 3 is a top plan view of the apparatus shown in FIG. 2.

When use of the flare tank apparatus is completed, the inlet conduit 32 is disconnected from the flare line 62. The inlet conduit is then arranged against the outer wall 18 of the holding tank for transportation from the job site. To do this, the unions 46, 46A are loosened and the elbows 44, 56 are swivelled so that the portion of the inlet conduit below the union 46 is positioned as flat as reasonably possible adjacent to side wall 18, as shown in FIGS. 2 and 3. The unions are then tightened to hold the inlet conduit in this position. The compact placement of the inlet conduit against the holding tank wall greatly facilitates road transport of the apparatus and can avoid the need for a pilot car that is required for oversized loads.

It will be apparent from the foregoing description and from consideration of the drawings that the combination of two connectors in the inlet conduit that can be swivelled permits the end pipe section 58 of the inlet conduit to be moved to a variety of positions for connection to the flare line 62. In practice, this means that the flare tank apparatus can be unloaded at the job site close to the end of the flare line, without careful positioning, and then easily connected to the flare line by movement of the inlet conduit so that pipe section 58 is aligned with flare line 62 and their respective ends abut each other and are sealed together by a conventional threaded fitting. A special welded connection between the inlet conduit and the flare line, as in the prior practice, is unnecessary.

Because of the high pressures commonly experienced in the inlet conduit, the number of right angle turns should be minimized. In the preferred embodiment, there are four such right angle elbows (namely elbows 40, 44, 54 and 56), which has been found acceptable in use. It will be apparent to the reader that the configuration of the inlet conduit of the preferred embodiment, in addition to facilitating connection to the flare line, permits the inlet port of the degasser to be at a higher elevation than the flare line (which ordinarily runs along the ground). This is desirable in providing greater volume within the degasser that is below the level of the inlet port and accordingly a greater working volume.

Although the invention has been described in terms of its preferred embodiments, it is not intended that the invention be limited to these embodiments. Various modifications within the scope of the invention will be apparent to those skilled in the art. For example the inlet conduit may comprise additional connector unions to permit further adjustment of the position of the inlet conduit; e.g. a union in place of pipe section 52 would permit adjustment of the vertical position of end 60 of the inlet conduit, if that is desired. The scope of the invention is defined by the claims that follow.

What is claimed is:

1. A flare tank apparatus for separating combustible gases from a mixture of said gases and a liquid comprising:
    (a) a degasser for receiving said gases and liquid, said degasser having an inlet port, a liquid outlet port and a gas outlet port;
    (b) a holding tank operatively connected to said liquid outlet port of said degasser for receiving from said degasser said liquid at least partly separated from said gases;
    (c) a flare stack for conveying said gases from said gas outlet port to a burner, and
    (d) an inlet conduit operatively connected at one end thereof to said inlet port of said degasser and adapted to be connected at a second end thereof to a flare line, said conduit comprising at least two connectors which permit components of said inlet conduit to swivel relative to each other, said connectors being capable of being loosened to permit such swivelling without disassembling said inlet conduit and capable of being tightened to prevent such swivelling and secure said inlet conduit in a fixed position.

2. An apparatus according to claim 1 wherein said inlet conduit comprises at least four elbows each defining an angle of approximately 90 degrees.

3. An apparatus according to claim 1 wherein said inlet conduit comprises a conduit section that connects to said flare line in a substantially horizontal position.

4. A flare tank apparatus for separating combustible gases from a mixture of said gases and a liquid comprising:
    (a) a degasser for receiving said gases and liquid, said degasser having an inlet port, a liquid outlet port and a gas outlet port;
    (b) a holding tank operatively connected to said liquid outlet port of said degasser for receiving from said degasser said liquid at least partly separated from said gases;
    (c) a flare stack for conveying said gases from said gas outlet port to a burner, and
    (d) an inlet conduit operatively connected at one end thereof to said inlet port of said degasser and adapted to be connected at a second end thereof to a flare line, said conduit comprising at least two connectors which permit components of said inlet conduit to swivel relative to each other, said connectors being capable of being loosened to permit such swivelling without disassembling said inlet conduit,
wherein said holding tank is an open-topped tank having side walls and a bottom wall and said degasser is positioned within said holding tank and extending upwardly therefrom.

5. An apparatus according to claim 4 wherein said inlet port of said degasser is positioned such that part of its area is above and part is below an upper edge of said side walls of said holding tank.

6. An apparatus according to claim 5 wherein said part is approximately one-half.

7. An apparatus according to claim 4 wherein said inlet port is in a side wall of said degasser and said inlet conduit comprises a conduit section that connects to said inlet port in a generally horizontal position.

8. An apparatus according to claim 1 wherein said second end of said inlet conduit is positioned for generally horizontal connection to said flare line.

9. An apparatus according to claim 1 wherein said connectors are adapted to swivel at least a portion of said inlet conduit into a position adjacent to a side wall of said holding tank.

10. An apparatus according to claim 1 wherein said degasser further includes a wear plate spaced from said inlet port of said degasser.

11. An apparatus according to claim 1 further including a suction pipe extending between a position within said holding tank and a position outside of said holding tank.

12. An apparatus according to claim 1 wherein there are two said connectors.

13. An apparatus according to claim 1 wherein there are three said connectors.

14. An apparatus according to claim 1 wherein at least a portion of said inlet conduit is in a position adjacent to a side wall of said holding tank and said connectors tightly to secure said portion of said inlet conduit in said position.

15. An apparatus according to claim 1 wherein said connectors are in a tightened position and prevent such swivelling of said components.

* * * * *

UNITED STATES PATENT AND TRADEMARK OFFICE
CERTIFICATE OF CORRECTION

| | | |
|---|---|---|
| PATENT NO. | : 7,141,099 B2 | Page 1 of 1 |
| APPLICATION NO. | : 10/765938 | |
| DATED | : November 28, 2006 | |
| INVENTOR(S) | : Stanley R.J. Ross and Roddy J. Ross | |

It is certified that error appears in the above-identified patent and that said Letters Patent is hereby corrected as shown below:

Column 2 line 41, please delete "bath" and replace it with --both--.

Column 6 line 39, please delete "to".

Signed and Sealed this

Twenty-fourth Day of April, 2007

JON W. DUDAS
*Director of the United States Patent and Trademark Office*